(12) United States Patent
McDonald et al.

(10) Patent No.: US 8,659,273 B2
(45) Date of Patent: Feb. 25, 2014

(54) SOFT-SWITCHING VOLTAGE REGULATION IN A STEP-DOWN CIRCUIT

(75) Inventors: Brent A. McDonald, Murphy, TX (US); Constantin Darius Livescu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 897 days.

(21) Appl. No.: 12/258,928

(22) Filed: Oct. 27, 2008

(65) Prior Publication Data
US 2010/0102784 A1    Apr. 29, 2010

(51) Int. Cl.
*G05F 1/59*    (2006.01)
(52) U.S. Cl.
USPC .......................................... 323/271; 323/282
(58) Field of Classification Search
USPC .......................................... 323/271, 282, 283
See application file for complete search history.

(56) References Cited

U.S. PATENT DOCUMENTS

| | | | |
|---|---|---|---|
| 4,841,220 A | | 6/1989 | Tabisz et al. ................... 323/282 |
| 5,689,178 A | * | 11/1997 | Otake ............................ 323/282 |
| 5,781,419 A | | 7/1998 | Kutkut et al. .................... 363/17 |
| 5,914,587 A | * | 6/1999 | Liu ................................ 323/222 |
| 5,923,153 A | * | 7/1999 | Liu ................................ 323/222 |
| 6,051,961 A | * | 4/2000 | Jang et al. ...................... 323/224 |
| 6,108,215 A | | 8/2000 | Kates et al. ...................... 363/17 |
| 6,259,235 B1 | * | 7/2001 | Fraidlin et al. ................. 323/222 |
| 6,690,143 B2 | | 2/2004 | Lin et al. ........................ 323/222 |
| 6,710,582 B2 | * | 3/2004 | Watanabe ....................... 323/222 |
| 7,321,224 B2 | * | 1/2008 | Iwamoto et al. ............... 323/262 |
| 7,548,435 B2 | * | 6/2009 | Mao .................................. 363/16 |
| 7,579,814 B2 | * | 8/2009 | Orr ................................ 323/259 |
| 2006/0076942 A1 | * | 4/2006 | Huber et al. ................... 323/282 |
| 2007/0159212 A1 | | 7/2007 | Price et al. ..................... 326/120 |
| 2008/0084197 A1 | * | 4/2008 | Williams et al. ............... 323/282 |

OTHER PUBLICATIONS

Toshiba 2SK2837 MOSFET datasheet. Jun. 27, 2001. Retrieved from http://www.datasheetcatalog.org/datasheet/toshiba/2881.pdf on Oct. 28, 2011.*
U.S. Patent Application Entitled "Phase Shedding Converter with Ripple Minimization", 18 pages.

* cited by examiner

*Primary Examiner* — Adolf Berhane
*Assistant Examiner* — Fred E Finch, III
(74) *Attorney, Agent, or Firm* — Baker Botts L.L.P.

(57) ABSTRACT

An information handling system may comprise a direct-current to direct-current step-down power converter, a memory, and a processor. The step-down power converter may include a first inductive unit, a first switching unit connected between a voltage source and the first inductive unit, a second switching unit connected to ground, a capacitance unit connected between the second switching unit and the first inductive unit, and a second inductive unit connected between the second switching unit and the first inductive unit. The capacitance unit is configured to delay a change in voltage across the first or second switching units, and the second inductive unit is configured to delay a change in current in the first or second switching units.

16 Claims, 4 Drawing Sheets

SOFT-SWITCHING VOLTAGE REGULATION IN A STEP-DOWN CIRCUIT

TECHNICAL FIELD

The present disclosure relates in general to power systems for information handling systems, and more particularly to soft-switching voltage regulation in a step-down circuit, e.g., for reducing power losses in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems use step-down voltage converters to deliver a constant voltage power level to system elements (i.e., a load), wherein the desired voltage level is lower than the voltage available to the system. Some step-down voltage converters such as buck converters use the technique of switching power on and off to a circuit with capacitance and inductive elements to deliver a substantially constant lower voltage to the load of the information handling system. There are inherent power losses with each switching action.

SUMMARY

In accordance with one embodiment of the present disclosure, an information handling system may comprise one or more direct-current to direct-current step-down voltage converters, a memory, and a processor. The step-down voltage converter may include a first inductive unit, a first switching unit connected between a voltage source and the first inductive unit, a second switching unit connected to ground, a capacitance unit connected between the second switching unit and the first inductive unit, and a second inductive unit connected between the second switching unit and the first inductive unit. The capacitance unit is configured to delay a change in voltage across the first or second switching units, and the second inductive unit is configured to delay a change in current in the first or second switching units.

In accordance with another embodiment of the present disclosure, a direct-current to direct-current step-down converter circuit may comprise a first inductive unit, a first switching unit connected between a voltage source and the first inductive unit, a second switching unit connected to ground, a capacitance unit connected between the second switching unit and the first inductive unit, and a second inductive unit connected between the second switching unit and the first inductive unit. The capacitance unit is configured to delay a change in voltage across the first or second switching units, and the second inductive unit is configured to delay a change in current in the first or second switching units.

In accordance with yet another embodiment of the present disclosure, a method is provided for operating a direct-current to direct-current step-down converter circuit that includes a switching unit, a capacitance unit configured to delay a change in voltage across the switching unit, and an inductive unit configured to delay a change in current in the switching unit. The method may include switching the switching unit such that an outside voltage source is applied to the step-down converter circuit, wherein upon of the outside voltage source to the step-down converter circuit, the capacitance unit operates to delay a change in voltage across the switching unit, the inductive unit operates to delay a change in current across the switching unit.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-8, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1:
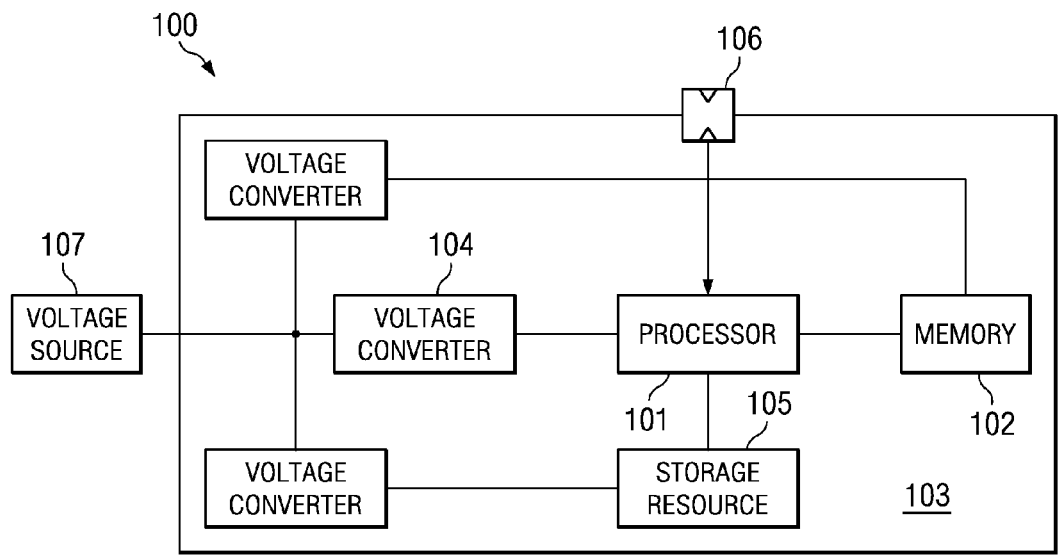
FIG. 1 illustrates a block diagram of an example system for providing a voltage converter with soft-switching to one or more information handling systems, according to certain embodiments of the present disclosure.

FIG. 1 illustrates a block diagram of an example system 100 including a soft-switching voltage converter 104 configured to regulate power delivered to components of one or more information handling system 103, in accordance with the present disclosure. In the illustrated embodiment, voltage converter 104 is configurable to deliver power to components of one information handling system 103. However, in other embodiments, voltage converter 104 may deliver power to components of any number of multiple information handling systems 103.

As depicted in FIG. 1, information handling system 103 may comprise a processor 101, a memory 102 communicatively coupled to processor 101, a network port 106 communicatively coupled to processor 101, a local storage resource 105 communicatively coupled to processor 101, and a voltage source 107. For purposes of clarity, each information handling system may generally be referred to as "information handling system 103" in the present disclosure.

Each processor 101 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 101 may interpret and/or execute program instructions and/or process data stored in memory 102 and/or another component of information handling system 103.

Each memory 102 may be communicatively coupled to its associated processor 101 and may comprise any system, device, or apparatus operable to retain program instructions or data for a period of time (e.g., computer-readable media). Each memory 102 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 103 is turned off.

Each network port 106 may be any suitable system, apparatus, or device operable to serve as an interface between its associated information handling system 102 and any suitable communications network. Each network port 106 may enable its respective information handling system 103 to communicate over the network using any suitable transmission protocol and/or standard.

Each local storage resource 105 may comprise computer-readable media (e.g., hard disk drive, floppy disk drive, CD-ROM, and/or other type of rotating storage media, flash memory, EEPROM, and/or other type of solid state storage media) and may be generally operable to store data.

Soft-switching voltage converter 104 may be used to provide power from voltage source 107 to one or more components of the information handling system. Soft-switching voltage converter 104 is a direct-current to direct-current converter (e.g. a step-down converter) that utilizes additional inductive and capacitive components to delay the rise of voltage and current inside of switching elements to reduce power losses, as discussed below in greater detail.

Voltage source 107 can be any source of AC or DC voltage or electrical power, and may or may not require transformation into a DC voltage. In various embodiments, voltage source 107 may be, but not limited to, a power outlet in combination with a transformer or adapter, a battery, or a power supply. Voltage source 107 may or may not be internal to the information handling system 103. Voltage source 107 also may or may not be internal to or integrated with soft-switching voltage converter 104.

Figure 2:
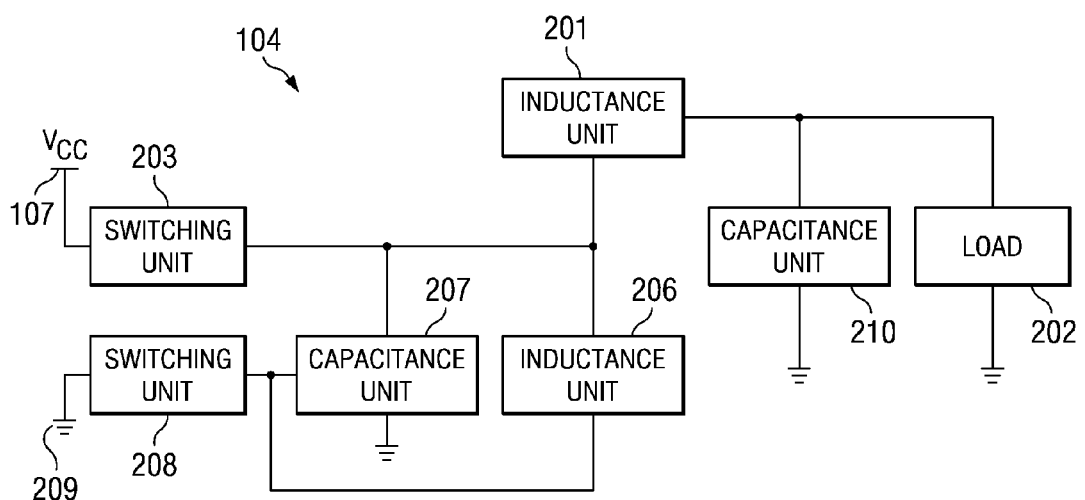
FIG. 2 illustrates a high-level view of a DC-DC converter with soft switching functionality, according to certain embodiments of the present disclosure.

FIG. 2 illustrates a direct-current to direct-current soft-switching voltage converter 104, according to certain embodiments of the present disclosure. Voltage converter 104 may include voltage source 107, a first switching unit 203 for controlling whether voltage source 107 is connected to the circuit, a second switching element 208 for controlling whether the circuit is connected to a ground 209, a first inductive element 201 with inductive properties (e.g., storing energy in an electrical circuit and resisting change in current), a second inductive element 206 with inductive properties, a first capacitance unit 207 with capacitance properties (e.g., storing energy in an electrical circuit and resisting change in voltage), and a second capacitance unit 210 with capacitance properties.

Soft-switching voltage converter 104 provides power to a load 202. Load 202 may include any one or more components of information handling system 103, such as processor 101, memory 102, or storage resource 105. In one embodiment, load 202 may be an electrical component not a part of an information handling system 103.

Voltage source 107 supplies power to voltage converter 104 which converts voltage and delivers it to load 202. First switching unit 203 is connected to voltage source 107 and controls the application of power to the rest of the circuit. Second switching unit is connected to ground 209 and regulates the connection of ground to the rest of the circuit. First switching unit 203 is connected to first capacitance unit 207, first inductive unit 201, and second inductive unit 206. Second switching unit 208 is connected to the polar end of first capacitance unit 207 and to the polar end of second inductive unit 206. The polar end of first inductive unit 201 is connected to load 202. Optionally, a second capacitance unit 210 may be also connected to the inductive unit 201.

In operation, a power cycle includes a "power on" phase in which first switching unit 203 is switched on and second switching unit 208 is switched off, followed by a "power off" phase, in which first switching unit 203 is switched off and second switching unit 208 is switched on.

The switching of first switching unit 203 and second switching unit 208 may be accomplished by a variety of control mechanisms. In certain embodiments, a control signal may be used to control first switching unit 203 and second switching unit 208. In one embodiment, the control signal comprises a periodic signal with a known high frequency, connected inversely to each switching unit 203, 208. For example, the periodic signal may be a high-frequency square wave with a particular duty cycle, where the duty cycle represents the ratio of (a) the cycle period in a high logic state representing "on" to (b) the entire cycle period. The resulting duty cycle of the power cycle will correspond to the duty cycle of the control signal. In other embodiments, the duty cycle of the power cycle represents the ratio of (a) the "power on" phase of a power cycle to (b) the entire duration (the "power on" phase plus the "power off" phase) of the power cycle. The power cycle may be repeated any number of times as desired.

As mentioned above, to initiate "power on" phase of a power cycle, first switching unit 203 is switched on and second switching unit 208 is switched off. Voltage source 107 is thus applied to first inductive unit 201, second inductive unit 206, and first capacitance unit 207. The polar end of first capacitance unit 207 and second inductive unit 206 are isolated from ground 209 by switching unit 208. The current through first inductive unit 201 begins to rise while its voltage is approximately equal to that of voltage source 107 less the voltage across load 202. Energy is thus stored in first inductive unit 201 and transferred to the load 202 during this "power on" phase of the power cycle.

After the "power on" phase, a "power off" phase of the power cycle is initiated by switching first switching unit 203 off or otherwise isolating the circuit from voltage source 107, and switching second switching unit 208 on or otherwise connecting the circuit to ground 209, the current through first inductive unit 201 decreases. During the "power off" phase, the voltage across first inductive unit 201 is approximately the value of the voltage across load 202. This voltage across first inductive unit 201 has a reverse polarity compared to the voltage across first inductive unit 201 during the "power on" phase, resetting the magnetic core of inductive element 201.

The output voltage from voltage converter 104 delivered to resistive load 202 is generally less than the voltage supplied by voltage source 107. If the current through first inductive unit 201 is not allowed to reach zero amperes during the power cycle, the output voltage delivered to resistive load 202 is simply the input voltage times the duty cycle of the power cycle. If the current through first inductive unit 201 does reach zero amperes before the completion of a "power on" or "power off" phase, the output voltage delivered to resistive load 202 also depends upon the value of voltage supplied by voltage source 107, the duty cycle, the inductance value of first inductive unit 201, the period of the signal controlling first switching unit 203, and the current delivered to resistive load 202.

When second switching element 208 is switched on, the inductive element 201 conducts current into load element 202. When second switching element 208 is switched off, the current flows through the second switching element 208.

When first switching element 203 is switched on to connect voltage source 107 to the circuit, the voltage across first switching element 203 drops dramatically to zero or a similar low value while the current passing through first switching element 203 begins to rise from zero or a similarly low value.

In certain embodiments of the present disclosure, second inductive unit 206 affects the rate of change of the current rising in first switching element 203 by resisting the rising current. Voltage across first switching element 203 is substantially less by the time that the current passing through first switching element 203 begins to rise. Thus, relatively low values of current and voltage are simultaneously present in first switching element 203.

In the prior art, without second inductive unit 206, first switching element 203 would be switched on and apply voltage source 107 to a circuit approximating a short-circuit, due to the immediate prior "on" state of second switching element 208. As a result, high peak currents would pass through first switching element 203 resulting in power losses.

In prior art, when first switching element 203 is switched off to isolate voltage source 107 from the rest of the circuit, the current passing through first switching element 203 begins to fall while the voltage across first switching element 203 begins to rise.

In some embodiment of the present disclosure, first capacitance unit 207 affects the rate of change of the voltage across first switching element 203 by resisting the fall in voltage. Current running through first switching element 203 is substantially less by the time that the voltage across first switching element 203 begins to rise. Thus, relatively low values of current and voltage are simultaneously present in first switching element 203.

Figure 3:
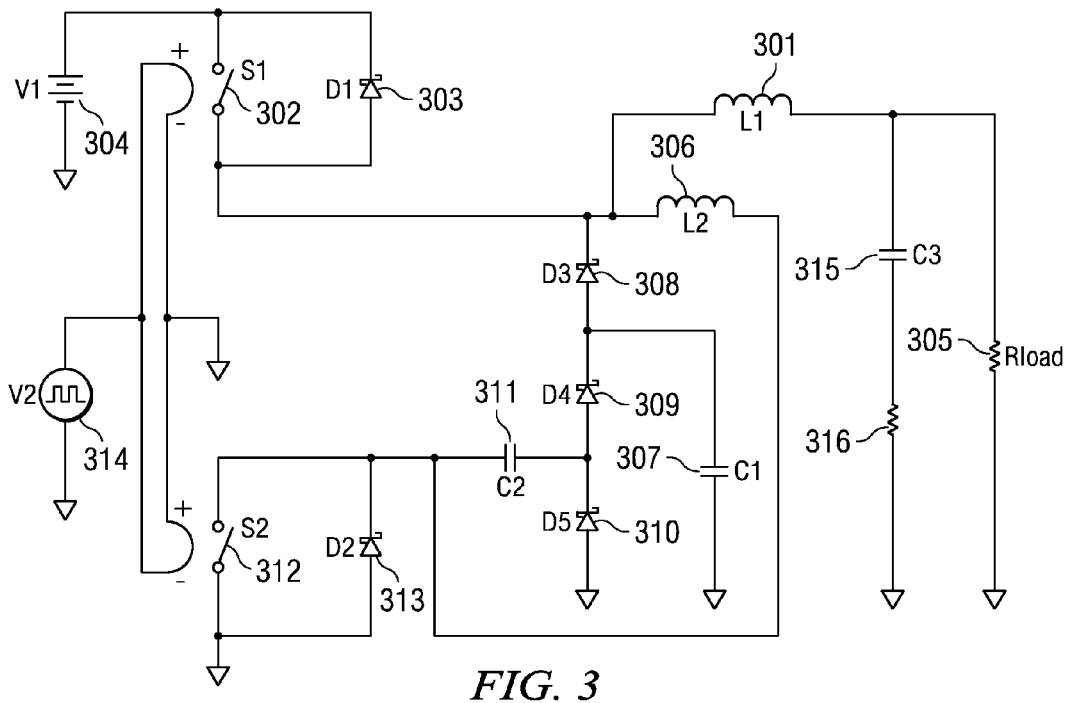
FIG. 3 illustrates a more detailed view of a DC-DC converter with soft-switching functionality, according to certain embodiments of the present disclosure.

FIG. 3 illustrates a more detailed view of a DC-DC converter with soft-switching functionality, according to certain embodiments of the present disclosure. Elements in FIG. 3 illustrate specific example elements for the elements of FIG. 2.

For example, viewing FIGS. 2 and 3 together, first switching unit 203 of FIG. 2 may comprise a first switch 302 in parallel with a first diode 303. Second switching unit 208 may include a second switch 312 in parallel with a second diode 313. First diode 303 may be connected to first inductive unit 201 at the anode of first diode 303, and connected to the voltage source 304 at the cathode of first diode 303. Voltage source 107 of FIG. 2 may comprise a 12V direct current voltage source 304. In certain embodiments, first switch 302 and second switch 312 may be controlled by a periodic square signal source 314 connected inversely between them. Periodic square signal source 314 may be a 350 kHz signal, with a duty cycle of 0.1919, alternating between +/31 12V. First switch 302 and second switch 312 may comprise MOSFET transistors, for example.

Second switching unit 208 of FIG. 2 may comprise a single second diode 313 connected between ground at its anode and the first capacitance unit at its cathode, as shown in FIG. 3.

First inductive unit 201 of FIG. 2 may comprise a first inductor 301. First inductor 301 may have a value of 500 nH. Second inductive unit 206 of FIG. 2 may comprise a second inductor 306. Second inductor 306 may have a value of 60 nH. In some embodiments, first inductor 301 and second inductor 306 may be a single coupled inductor.

First capacitance unit 207 of FIG. 2 may comprise a first capacitor 307 and a reset circuit. First capacitor 307 may have a value of 7.5 nF. The reset circuit may comprise a third diode 308 connected at its cathode to first switching unit 203 and connected at its anode to the cathode of a fourth diode 309. Fourth diode 309 may be connected at its anode to the cathode of a fifth diode 310. Fifth diode 310 may be connected to ground at its anode. The reset circuit may further comprise a second capacitor 311 connected to a junction between fourth diode 309 and fifth diode 305. Second capacitor 311 may have a value of 220 nF. Second capacitor 311 may be connected on its other end to the rest of the circuit, preferably to second inductive unit 306 and second switching unit 208. First capacitor 307 may be connected between ground and a junction between fourth diode 309 and third diode 308. The reset circuit recirculates the energy stored in inductive units 201, 206 and capacitance unit 207 in a resonant mode, resetting the voltages and currents on each unit to the proper values to achieve soft-switching operation at the start of each power cycle.

Second capacitance unit 210 may comprise a third capacitor 315 and a first resistor 316 in series. Second capacitor may have a value of 990 uF.

Load 202 of FIG. 2 may take many forms but can be represented as a single second resistor 305.

It should be understood that any values recited herein (e.g., values for capacitance, frequency, voltage, etc.) are examples only, and components providing any other suitable values may be similarly used.

Figure 4:
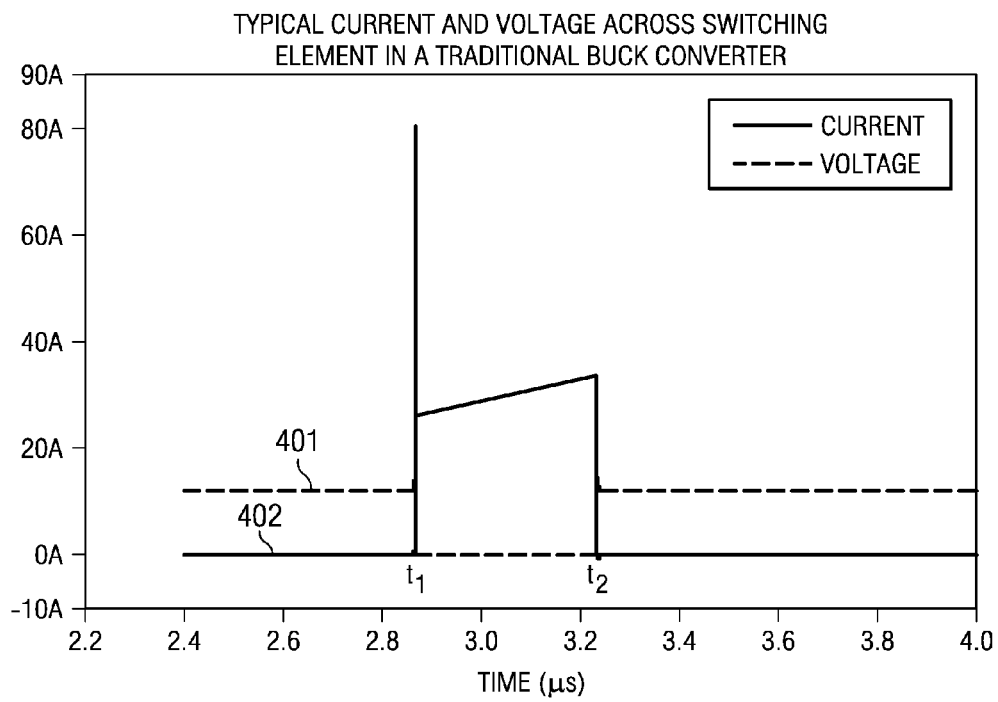
FIG. 4 illustrates typical current and voltage across a switching element in a prior art buck converter.

FIG. 4 illustrates typical current and voltage across a switching element as the switching element is enabled and disabled in a prior-art step-down voltage converter. Before the switching element is enabled, the voltage across the switching element, indicated at 401, is approximately equal to the voltage of the voltage source to which the switching element is connected. The current running through the switching element, indicated at 402, is zero amperes. When the switch is enabled at t1 the voltage drops to zero and the current rises. Likewise when the switch is disabled at t2, the voltage rises sharply and the current drops.

Figure 5:
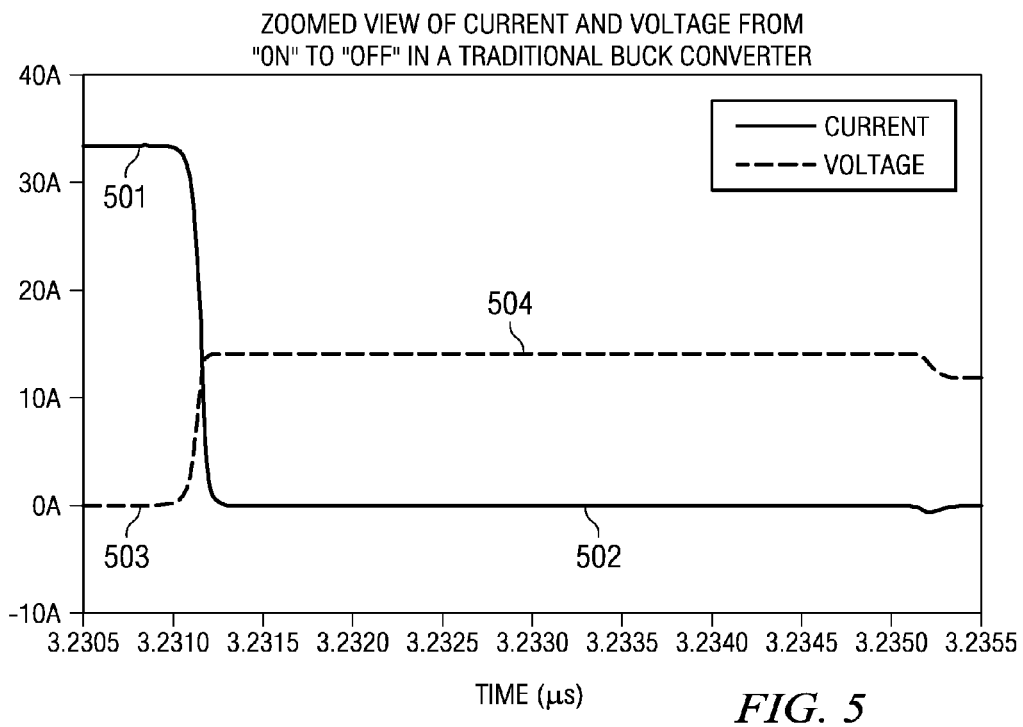
FIG. 5 illustrates a closer view of typical current and voltage across a switching element in a prior art buck converter when the element is switched from "On" to "Off"

FIG. 5 illustrates in greater detail the voltage and current through the switching element during such a transition from "on" to "off" in a typical prior-art step-down voltage converter (e.g., a buck converter). During the transition, the non-ideal nature of the elements in the power converter causes both the current, indicated at 501, and the voltage, indicated at 503, to not immediately reach their "power-off" conditions, indicated at 502 and 504, respectively. As the current 501 falls and the voltage 503 rises, each has a non-zero value for a period of time. The instantaneous power lost as a result equals the product of the current and the voltage.

Figure 6:
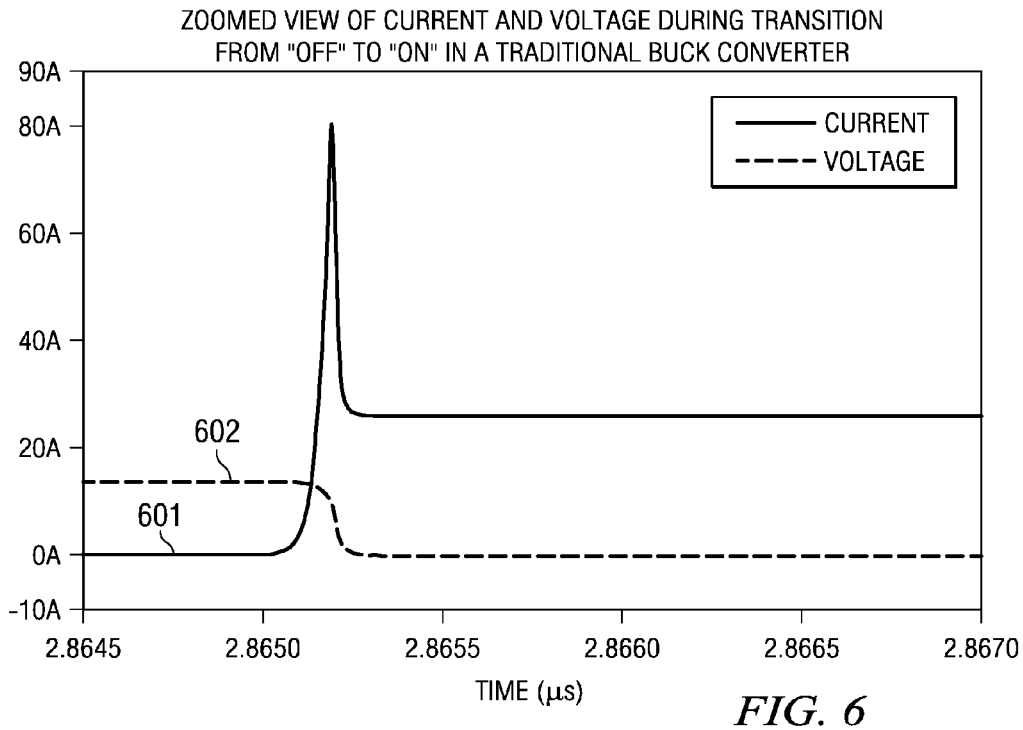
FIG. 6 illustrates a closer view of typical current and voltage across a switching element in a prior art buck converter when the element is switched from "Off" to "On"

FIG. 6 illustrates the analogous situation to FIG. 5, wherein the switching element transitions from "off" to "on" in a typical prior-art step-down voltage converter (e.g., a buck converter). As the current indicated, at 601, rises sharply in response to the switching element being enabled, the voltage, indicated at 602, drops. As the current 601 falls and the voltage 602 rises, each has a non-zero value for a period of time. The instantaneous power lost as a result equals the product of the current and the voltage.

Figure 7:
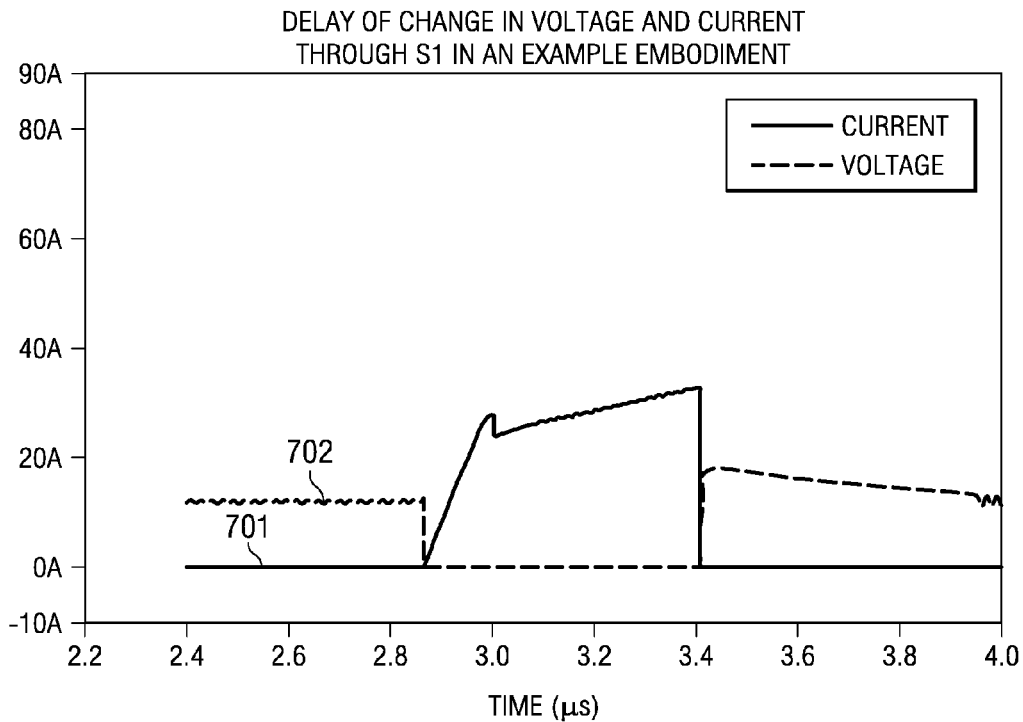
FIG. 7 illustrates the delay of change in voltage and current through a switching element of a voltage converter using soft switching functionality, according to certain embodiments of the present disclosure.

FIG. 7 illustrates the voltage and current present in first switching unit 203 shown in FIG. 2 during operation of an embodiment of the present disclosure. When the switch is switched from "off" to "on" the rise in the current, indicated at 701, is delayed or softened by second inductive unit 206 while the voltage 702 drops to zero. Likewise, when the switch is switched from "on" to "off," the rise in voltage 702 is delayed or softened by first capacitance unit 207 while the current 701 drops to zero.

Figure 8:
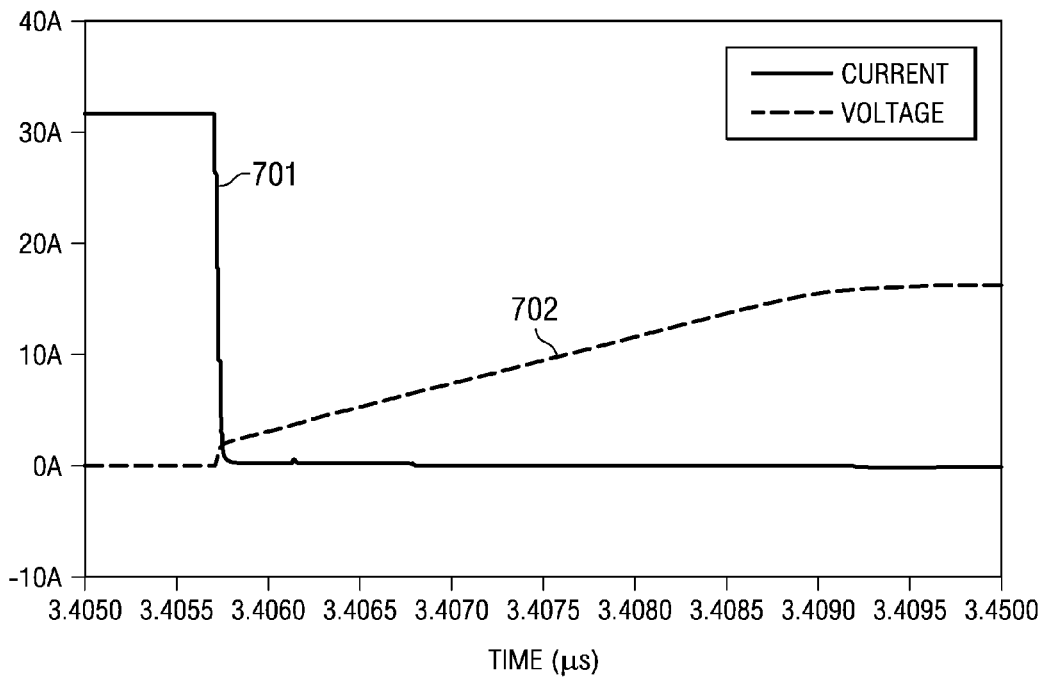
FIG. 8 illustrates in greater detail the delay in FIG. 7 in the rise of voltage 702 when the switching element is switched from "on" to "off."

FIG. 8 illustrates in greater detail the delay in FIG. 7 in the rise of voltage 702 relative to the current 701 when the switched is switched from "on" to "off."

The instantaneous electrical power lost in a switching element is equal to the product of the current and voltage present at the same time in the switching element. By delaying the rise in current through or voltage across the switching element, power losses are reduced.

The present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   a memory communicatively coupled to the processor; and
   a direct-current to direct-current step-down converter circuit, comprising:
      a first inductive unit, a first terminal of the first inductive unit coupled to a switching node and a second terminal of the first inductive unit coupled to a load terminal;
      a first switching unit, a first terminal of the first switching unit coupled to a positive terminal of a voltage source and a second terminal of the first switching unit coupled to the first inductive unit at the switching node;
      a second switching unit coupled to ground;
      a capacitance unit, a first terminal of the capacitance unit coupled to the second switching unit, and a second terminal of the capacitance unit coupled to the first inductive unit and the first switching unit at the switching node, the capacitance unit configured to delay a change in voltage across the first switching unit; and
      a second inductive unit, a first terminal of the second inductive unit coupled to the second switching unit and a second terminal of the second inductive unit coupled to the first inductive unit and the first switching unit at the switching node, the second inductive unit configured to delay a change in current in the first switching unit.

2. An information handling system of claim 1, wherein the capacitance unit includes a capacitor and a reset circuit.

3. An information handling system of claim 1, wherein the first inductive unit and the second inductive unit are operatively coupled together.

4. An information handling system of claim 1, further comprising a load, wherein the first inductive unit is coupled between the load and the first switching unit.

5. An information handling system of claim 1, further comprising a second capacitive unit, wherein the first inductive unit is connected between the second capacitance unit and the first switching unit.

6. An information handling system of claim 1, wherein at least one of the switching units includes a MOSFET switch.

7. An information handling system of claim 1, wherein at least one of the switching units includes a diode.

8. An information handling system of claim 1, wherein at least the first switching unit is controlled by a periodic signal.

9. A direct-current to direct-current step-down converter circuit, comprising:
   a first inductive unit, a first terminal of the first inductive unit coupled to a switching node and a second terminal of the first inductive unit coupled to a load terminal;
   a first switching unit, a first terminal of the first switching unit coupled to a positive terminal of a voltage source and a second terminal of the first switching unit coupled to the first inductive unit at the switching node;
   a second switching unit coupled to ground;
   a capacitance unit, a first terminal of the capacitance unit coupled to the second switching unit, and a second terminal of the capacitance unit couple to the first inductive unit and the first switching unit at the switching node, the capacitance unit configured to delay a change in voltage across the first switching unit; and
   a second inductive unit, a first terminal of the second inductive unit coupled to the second switching unit and a second terminal of the second inductive unit coupled to the first inductive unit and the first switching unit at the switching node, the second inductive unit configured to a delay a change in current in the first switching unit.

10. A direct-current to direct-current step-down converter circuit of claim 9, wherein the capacitance unit includes a capacitor and a reset circuit.

11. A direct-current to direct-current step-down converter circuit of claim 9, wherein the first inductive unit and the second inductive unit are operatively coupled together.

12. A direct-current to direct-current step-down converter circuit of claim 9, wherein the first inductive unit is coupled between the first switching unit and a resistive load.

13. A direct-current to direct-current step-down converter circuit of claim 9, further comprising a second capacitive unit, wherein the first inductive unit is connected between the second capacitance unit and the first switching unit.

14. A direct-current to direct-current step-down converter circuit of claim 9, wherein at least one of the switching units includes a MOSFET switch.

15. A direct-current to direct-current step-down converter circuit of claim 9, wherein at least one of the switching units includes a diode.

16. A direct-current to direct-current step-down converter circuit of claim 9, wherein at least the first switching unit is controlled by a periodic signal.

\* \* \* \* \*